Feb. 19, 1924.
G. B. FRAZER
1,484,125
AUTOMATIC MOTION RECORDER FOR AUTOMOBILES
Filed June 28, 1922  2 Sheets-Sheet 1
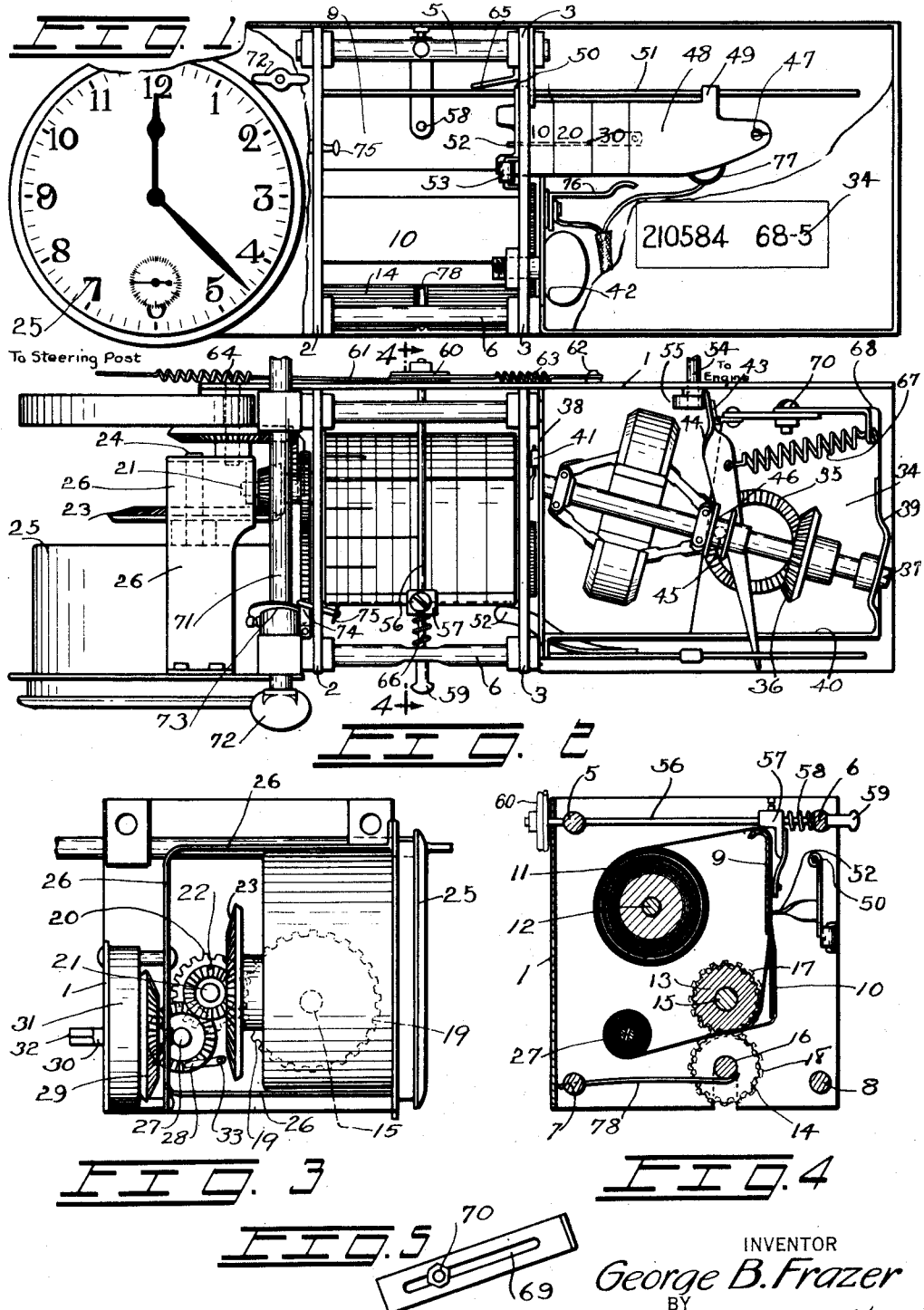
INVENTOR
George B. Frazer
BY
Harry Bowen
ATTORNEY Feb. 19, 1924.
G. B. FRAZER
1,484,125
AUTOMATIC MOTION RECORDER FOR AUTOMOBILES
Filed June 28, 1922
2 Sheets-Sheet 2
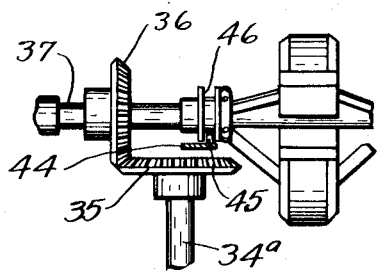
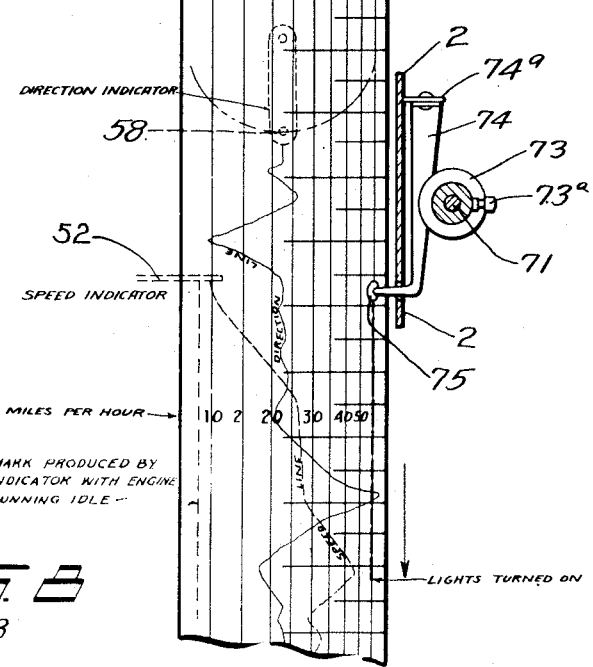
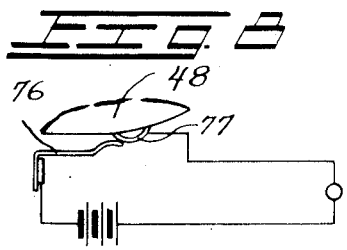
INVENTOR
*George B. Frazer*
*Harry Bowen*
ATTORNEY Patented Feb. 19, 1924.

1,484,125

UNITED STATES PATENT OFFICE.

GEORGE B. FRAZER, OF WELLINGTON, WASHINGTON.

AUTOMATIC MOTION RECORDER FOR AUTOMOBILES.

Application filed June 28, 1922. Serial No. 571,440.

*To all whom it may concern:*

Be it known that I, GEORGE B. FRAZER, a citizen of the United States, residing at Wellington, county of King, and State of Washington, have invented a new and useful Automatic Motion Recorder for Automobiles; and I do hereby declare that the following is a full, clear, and exact specification, such as will enable others skilled in the art to which it appertains to make and use the same.

The invention is a device for recording the speed at which a motor vehicle is traveling, the turning of the vehicle to the right or left, the time the lights are on and the time the engine is running while the vehicle is standing still.

The object of the invention is to provide a device which will make an accurate record of the speed at which a motor vehicle is traveling.

Another object of the invention is to provide a device which will indicate whenever the machine is turned to the right or left.

Another object of the invention is to provide a device which will record the length of time the lights are on.

And a further object of the invention is to provide a means for recording the length of time the engine is running while the machine is standing idle.

And a still further object of the invention is to provide a warning light either on the instrument board or on the outside of the vehicle which will light when the machine is traveling above a certain speed.

With these ends in view the invention embodies a frame attached to a clock having a roll of paper in it, the outer end of which passes between a pair of corrugated rolls which are geared to the clock so that they will run with it. An additional clock spring is placed in the frame and geared to a roller to which the end of the paper is attached so that it will cause a tension in the paper. A speedometer is also installed in the frame with a governor attached to it and a lever attached to one end of the governor so that as the speed changes the lever will move backward and forward and move a marker across the paper. A small cam is installed at the end of the lever by which the marker is vibrated when the engine is running and the vehicle standing still. Another marker is pivoted over the paper and connected to the steering wheel and a cam is placed on the button that turns on the light which holds a small roller on the paper when the lights are on. An electric switch is also placed on the marker that is operated by the governor and connected with an electric light either on the instrument board or on the outside of the car.

Other features and advantages of the invention will appear from the following description taken in connection with the drawings, wherein:—

Figure 1 is a front elevation with the paper removed.

Figure 2 is a top plan view.

Figure 3 is an end elevation.

Figure 4 is a cross section on line 4—4 of Figure 2.

Figure 5 is a detail showing the speed adjusting lever.

Figure 6 is a detail view showing the method for controlling the speed indicator by the governor or speedometer.

Figure 7 is a detail view showing the tape with the speed indicated thereon in fine dash lines, the direction by a fine line and the time the lights were turned on, by a heavy dash line; and also the arm for supporting the light marker.

In the drawings I have shown my device as it would be assembled wherein number 1 indicates the back of the frame to which the two plates 2 and 3 are attached and these are bolted together by the bolts 5 and 6 at the top and 7 and 8 at the bottom. Between these plates is a guide plate 9 which is curved at the top as shown in Figure 4 and a white enamel plate 10 over which a thin strip of paper passes. A roll of paper 11 is also mounted upon a shaft 12 between the plates and this paper which should be made of a thin strip of tracing paper with a strip of carbon paper under it passes over the guide plate 9 and from there the tracing paper passes over the enamel plate 10 and the carbon paper passes under it. The paper then passes through a pair of corrugated rubber rolls 13 and 14 which are mounted upon shafts 15 and 16 between the plates. On one end of each of these shafts is a spur gear and these are arranged so that the gear 17 on the end of the shaft 15 meshes with the gear 18 on the end of the gear 16. On the opposite end of the shaft 15 is a large gear 19 as shown in Figure 3 which meshes with another gear 20 fixedly mounted on a shaft 21 and on this shaft is also a bevel gear 22 which meshes with a large bevel gear 23 on the shaft 24 which projects from the back of a clock 25. The shaft 21 and the outer end of the shaft 24 are supported in a bracket 26 which extends outward from the clock casing.

The paper then continues to a shaft 27 which is split so that the end of the paper may be slipped through it and this shaft is also arranged so that it may readily be taken out when it is desired to remove the roll of paper. One end of this shaft is placed inside of a bevel gear 28 which meshes with a large bevel gear 29 on a shaft 30. And on this shaft is also a spring 31 which may be wound up with a key that may be placed on the square end 32 of the shaft 30. This shaft is pivotally mounted in holes in the rear of the frame 1 and in a bracket 26. The latch 33 also engages the teeth of the gear 28 so that it will prevent the spring from unwinding while the shaft 27 is removed.

In the casing is a vertical shaft 34ª, which may be an extension of the speedometer shaft, the dial of which may be seen through the opening 34, or this shaft may be connected through a flexible shaft to one of the wheels of the vehicle so that it will rotate with it; and on this shaft is a bevel gear 35 which meshes with another bevel gear 36 on a governor shaft 37. This shaft is supported in holes in the side plates 38 and 39 of a frame 40 which also supports the speedometer. This frame is locked to the plate 3 by a hook 41 and a bolt 42. At the rear of the frame is a hinge 43 which supports a lever 44 and this lever has a pin 45 on its upper side which slides between the flanges of a spool 46 that is slidably mounted on the governor shaft and attached to the movable end of the governor. The outer end of this lever projects through a hole 47 in a plate 48 which is slidably mounted by the bearings 49 and 50 on a rod 51 and on the inside of this plate is a small plate 52 the extended end of which bears against the paper. The plate 48 is held downward by a small roller 53 on the side of the plate 3. It will be seen that as the speed is increased the governor will draw the lever 44 toward the section of the frame containing the paper and this will move the plate 52 across the paper which will cause a mark to be made on the under side of the tracing paper as it will be pushed against the carbon paper. Then as the paper moves until the mark passes over the enamel plate 10 the mark will be visible. The plate 48 is divided into graduations which are of different colors and marked, so that as the vehicle reaches different speeds they will show as the plate moves into the opening.

In the Figure 2 I have shown a rod 54 with a cam 55 on its end projecting through the rear plate 1 and as the opposite end of this rod is connected to the engine shaft it will rotate this cam while the engine is in motion. This cam bears against the rear end of the lever 44 and causes it to move backward and forward in a vibrating motion so that it will move the plate 52 backward and forward across the paper whenever the engine is in motion; so that a zigzag line will appear on the edge of the paper whenever the engine is running and the car is standing still. It will be seen that as soon as the car is started the governor will move the end of the lever 44 away from the cam 55 so that it will not be touched by it.

Between the bolts 5 and 6 is a shaft 56 on which is a lug 57 which has a spring with a point 58 attached to it that extends downward over the paper. On the outer end of the shaft 56 a knob 59 is mounted and on the inner end is a pulley 60 shown in Figure 2. Around the pulley 60 is a small wire 61, one end of which is attached to the plate 1 by a pin 62 and the other end of which is attached to the steering wheel. Between the pulley 60 and the pin 62 is a small tension spring 63 and between the pulley 60 and the steering wheel is a heavier spring 64. When the car is going straight ahead the pointer 58 will remain in the position shown in Figure 1 and as the car is turned in one direction the wire 61 will pull the pulley 60 and thereby rotate the point 58 in an arc in one direction and as the car is turned in the opposite direction the wire 61 will slacken and permit the spring 63 to twist the pulley 60 and the shaft 56 so that the pointer 58 will move in an arc in the opposite direction. A plate 65 may be placed on the plate 3 so that as the steering wheel is turned a considerable distance in one direction the point 58 will bear against the plate 65 and stop and the extra motion will be taken up by the spring 64. A spring 66 may be placed on the shaft 56 between the bolt 6 and the lug 57 in order to hold the point 58 against the paper.

A spring 67 may be fastened to the lever 44 and to a bracket 68 which has a slotted hole in it through which it is attached by a bolt 70 to the rear of the frame 40. It will be seen that as this plate is moved inward or outward it will adjust the tension on the governor and thereby regulate the movement of the plate 52 so that it may be regulated to work on any desirable graduations on the paper.

On a shaft 71 which has a thumb nut 72 on its outer end and which is mounted in bearings at each side of the frame and used to turn the lights on or off, is a cam 73 that may be held by a set screw 73ª, which cam bears against a bracket 74, which is attached to a projection 74ª on the plate 2 and which supports a roller 75. The cam holds the roller against the paper while the lights are on and allows it to remain above the paper when they are off. This will cause a light line to appear along the edge of the paper when the lights are on. On the side of the plate 38 is a contact point 76 which engages another contact point 77 when the plate 48 is moved toward the section containing the paper by the governor as the speed of the vehicle increases. As these two points engage they will complete an electric circuit which will light a lamp that may be placed on the instrument board or on the outside of the vehicle so that as the speed of the car exceeds a certain amount a warning will be given. This speed may be regulated by shortening or lengthening the contact point 76.

The shaft 16 shown in Figure 4 is placed in slotted holes in plates 2 and 3 and held upward by a spring 78 from the bolt 7. This may be arranged in this manner so that an even friction may be maintained upon the paper.

In Figure 2 I have shown lines across the paper indicating graduations which may be spaced or numbered in any desirable manner. It will be observed that some of these graduations extend across the paper and these may be made to indicate periods of time as those extending across the paper may indicate hours, those half way across half hours, and those one quarter of the way across quarter hours. The graduations extending longitudinally indicate the miles per hour and these would gradually come closer together as they approach the higher speeds. A blank space should be left on the paper in which the owner or chauffeur may write his name.

It will be understood that changes may be made in the construction without departing from the spirit of the invention. One of which changes may be in the design of the frame, and this may be made in any desired design to support the apparatus and to permit it to function as described. Any type of clock or just a clock spring may be used in place of the clock as shown. A double pointer operated by a double lever connected by two wires to the steering post may be used in place of the single wire 61 as shown. Any desirable type of a speedometer or just a flexible shaft connected to the gear 35 may be used in place of the speedometer shown and any desirable means may be used to connect a spring or clock to the paper rolls.

The construction will be readily understood from the foregoing description. To use the device it should be assembled as shown and the clock started and as the speed of the vehicle is increased the plate 52 will move across the paper and record the speed at which the vehicle is traveling. The pointer 58 will also move across the paper as the vehicle is turned to the right or left and will leave a semi-circular mark on the paper. As the lights are turned on the cam 73 will move the roller 75 down against the paper and cause a line to appear along the edge all the time the lights are on. This roller will be released as the lights are turned off. A zigzag line will appear along the opposite side of the paper if the engine is permitted to run while the vehicle is standing still which will be caused by the action of the small cam against the lever connected to the governor as hereinbefore described.

Having thus fully described the invention what I claim as new and desire to secure by Letters Patent, is:—

1. A motion recorder of the type described embodying a frame having springs in one end and a governor in the other; suitable means for connecting the governor to a wheel of the vehicle; a lever mounted on a hinge in the frame and connected to the end of the governor; a cam on the end of a shaft which is rotated by the engine shaft arranged in the frame so that it will engage the end of the lever; a plate slidably mounted in the frame so that it will engage the opposite end of the lever; a marker on the plate which may bear against a strip of paper which has a strip of carbon paper on its under side; a contact point on the lower side of the plate which engages an adjustable contact point on the frame to cause a lamp to light as the vehicle reaches a certain speed; suitable means for supporting the paper and for connecting it to a clock spring so that it will travel at a given speed; a small roller on the side of the paper which may be engaged by a cam on the rod which operates the light switch; and a pointer mounted upon a shaft which is connected to the steering wheel so that it rotates with it.

2. A device of the type described embodying a frame having springs in one end and a governor in the other; suitable means for connecting the governor to a vehicle in which the device is mounted so that it will rotate with the vehicle; paper with graduations and spaces mounted in the frame with a strip of carbon paper under it and connected to the spring in such a manner that it will travel at a regular speed; suitable means for transferring the motion of the governor to the paper; a pointer supported on a shaft which is connected to the steering wheel in such a manner that the pointer will mark the direction the vehicle turned on the paper; and a small roller suitably mounted in the frame so that as the lights are turned on it will bear against the paper.

3. A device of the type described comprising a frame with springs in one end and a governor in the other; suitable means for connecting the governor to a speedometer shaft; a strip of paper in the center of the frame mounted in such a manner that the springs will cause it to pass over a plate at a regular speed; a suitable means for marking the travel of the governor on the paper; a pointer bearing against the paper and supported on a shaft which is connected to the steering wheel so that it will rotate as the wheel is turned; a small roller mounted in the frame in such a manner that it will mark on a paper while the lights are turned on; suitable means for marking a line on the paper as the engine is running while the car is standing still; and a suitable means for lighting a lamp as the velocity of the vehicle reaches a given number of miles per hour.

GEORGE B. FRAZER.